United States Patent
Fidalgo et al.

(10) Patent No.: US 8,107,246 B2
(45) Date of Patent: Jan. 31, 2012

(54) ADHESIVE FORMAT ADAPTER FOR A STORAGE DEVICE AND METHOD FOR THE PRODUCTION THEREOF

(75) Inventors: Jean-Christophe Fidalgo, Gémenos (FR); Jean-Francois Martinent, La Ciotat (FR); Blandine Alleysson, Carnoux (FR)

(73) Assignee: Gemalto SA, Meudon (FR)

( * ) Notice: Subject to any disclaimer, the term of this patent is extended or adjusted under 35 U.S.C. 154(b) by 465 days.

(21) Appl. No.: 11/920,130

(22) PCT Filed: May 5, 2006

(86) PCT No.: PCT/EP2006/062085
§ 371 (c)(1),
(2), (4) Date: Nov. 9, 2007

(87) PCT Pub. No.: WO2006/122882
PCT Pub. Date: Nov. 23, 2006

(65) Prior Publication Data
US 2009/0040695 A1     Feb. 12, 2009

(30) Foreign Application Priority Data
May 11, 2005 (FR) ..................................... 05 51223

(51) Int. Cl.
*H05K 7/02* (2006.01)
(52) U.S. Cl. ......... 361/737; 235/492; 257/679; 439/945
(58) Field of Classification Search .................. 361/737; 439/945, 946; 257/679; 235/488, 492, 441
See application file for complete search history.

(56) References Cited

U.S. PATENT DOCUMENTS 5,410,136 A * 4/1995 McIntire et al. .............. 235/380
5,581,065 A * 12/1996 Nishikawa et al. ........... 235/492
5,677,524 A    10/1997 Haghiri-Tehrani
(Continued)

FOREIGN PATENT DOCUMENTS
EP         0 638 873 B1     10/2001
(Continued)

OTHER PUBLICATIONS
PCT/ISA/210.
(Continued)

*Primary Examiner* — Dameon Levi
(74) *Attorney, Agent, or Firm* — Buchanan Ingersoll & Rooney PC

(57) ABSTRACT

The invention relates to a format adapter comprising a storage device having: a front surface provided with electrical contact pads opposite a rear surface defining a lower peripheral border (2a); a body having a cavity (4) for receiving the device and opening on a front and rear side of the body, and; an adhesive film (8a), which is sensitive to pressure, adhered to the rear side of the body and which has at least one adhesive portion inside the cavity in order to hold the storage device. The adhesive film has an inner recess (10) essentially centered on the cavity and has at least one shoulder bordering on the cavity that assures a localized adhesion only on the lower peripheral border (2a) of the storage device. The invention also relates to a method for producing the adapter and to a use of the adapter for manufacturing and packaging the storage device.

17 Claims, 2 Drawing Sheets

U.S. PATENT DOCUMENTS

| | | | | |
|---|---|---|---|---|
| 5,936,227 | A | * | 8/1999 | Truggelmann et al. ........ 235/492 |
| 6,028,774 | A | * | 2/2000 | Shin et al. ...................... 361/764 |
| 6,065,681 | A | * | 5/2000 | Trueggelmann .............. 235/487 |
| 6,179,210 | B1 | * | 1/2001 | Haas et al. ..................... 235/488 |
| 6,320,751 | B2 | * | 11/2001 | Takeda et al. ................. 361/737 |
| 6,372,541 | B1 | * | 4/2002 | Bouchez et al. .............. 438/106 |
| 6,398,114 | B1 | * | 6/2002 | Nishikawa et al. ........... 235/492 |
| 6,454,164 | B1 | | 9/2002 | Wakabayashi et al. |
| 6,653,565 | B2 | * | 11/2003 | Kashima ........................ 174/521 |
| 6,964,377 | B1 | * | 11/2005 | Haghiri et al. ................ 235/492 |
| 7,150,406 | B2 | * | 12/2006 | Droz .............................. 235/492 |
| 7,183,636 | B1 | * | 2/2007 | Boccia et al. ................. 257/679 |
| 7,837,122 | B2 | * | 11/2010 | Martinent et al. ............ 235/492 |
| 2002/0160630 | A1 | | 10/2002 | Kashima |

FOREIGN PATENT DOCUMENTS

| | | |
|---|---|---|
| JP | 2003-162682 A | 6/2003 |
| JP | 2005-115840 A | 4/2005 |
| WO | WO 96/36009 A1 | 11/1996 |
| WO | WO 00/49567 A1 | 8/2000 |

OTHER PUBLICATIONS

English language translation of a Japanese First Office Action dated Nov. 16, 2010 issued in the corresponding Japanese Patent Application No. 2008-510550.

* cited by examiner

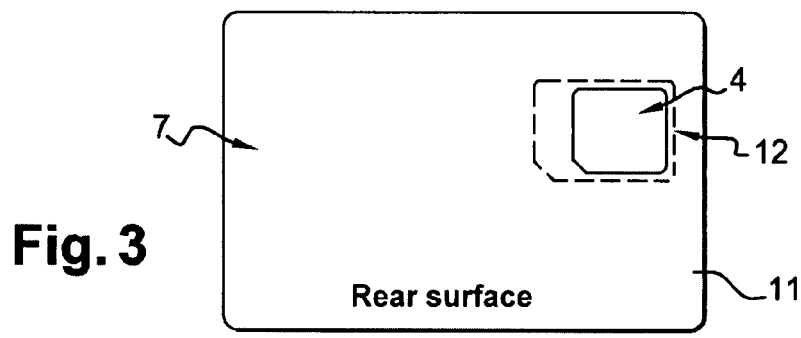
Fig. 3
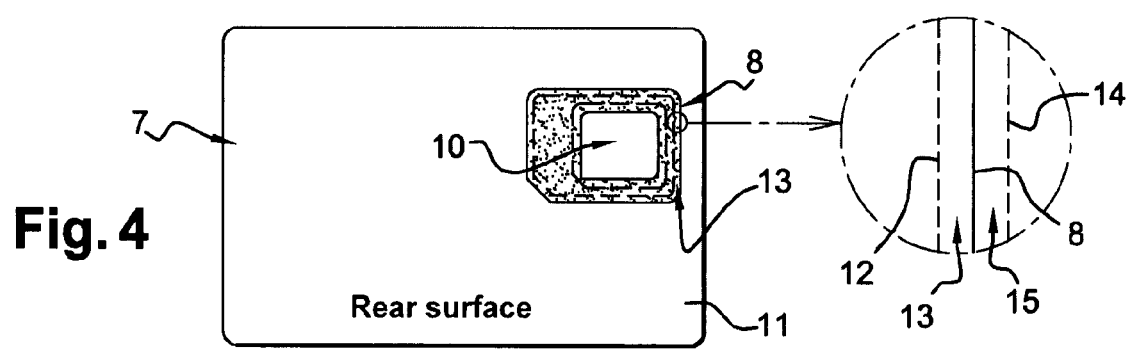
Fig. 4
Fig. 4a
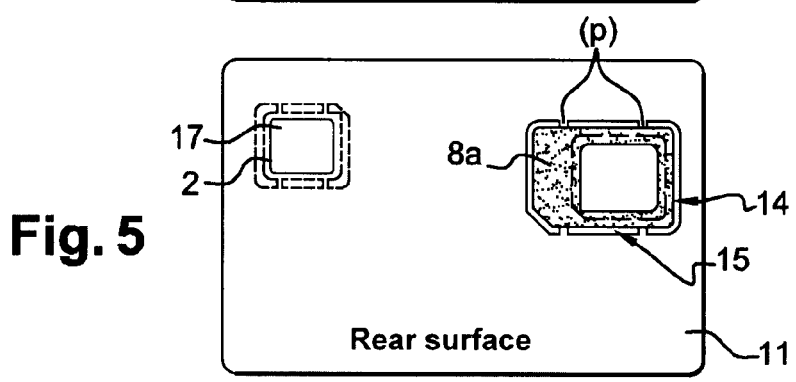
Fig. 5
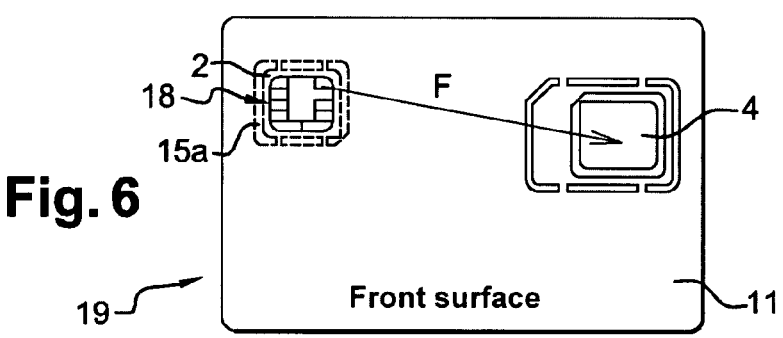
Fig. 6

ADHESIVE FORMAT ADAPTER FOR A STORAGE DEVICE AND METHOD FOR THE PRODUCTION THEREOF

The present invention relates to the field of storage devices and their associated format adapters.

It relates more particularly to a chip-card format adapter making it possible to obtain a different chip-card format. The various formats considered are preferably the standard formats that exist in the field of chip cards as presented below.

There are three main standard chip-card formats on the market. The first of these, "ID-1", is the format according to ISO 7816: 54 mm×85 mm×0.76 mm, for chip cards intended essentially for operations such as communication, identification or remote ticketing.

The second type, "ID-000", complies with the so-called Plug-in UICC standard, for chip cards essentially intended for being inserted in mobile telephones but which can also, if required, be used in other communication devices or USB readers. ID-000 cards have a rectangular card body with dimensions of 15 mm×25 mm×0.76 mm and a 3 mm×3 mm polarising slot on one corner of the card support.

The third type, since February 2004, comprises the so-called third form factor or Mini-UICC cards, which have a reduced format in line with the current trend of mobile telephone miniaturisation. The standard format is 15 mm×12 mm×0.76 mm, also with a 2.5 mm×2.5 mm polarising slot on one corner of the card support.

Among the adapter production methods, patent application EP 0638873 describes the production of a mini-card support card with an opening for accommodating the mini-card and a pressure-sensitive adhesive film glued to the rear surface of the support. A mini chip card is fixed to the adhesive film in the opening, and can be removed from the support without exerting force on the mini-card and without any projections on the peripheral edge of the mini-card.

This solution has the disadvantage of not allowing easy handling or extraction of the mini-card if the adhesion is too strong. On the other hand, if the adhesive strength of the adhesive is too low, the adhesive film is at risk of coming loose from the card body.

U.S. Pat. No. 5,677,524 describes a support card in ISO format containing a mini-card connected to the support card by pre-cut bridges and at least one pressure-sensitive adhesive strip glued to the rear surface of the card and extending partially across the card and the mini-card so that when the bridges are broken, the mini-card remains correctly positioned in the support, it being possible to remove and replace it without any limitations. Several strips can be provided to increase the stability of the mini-card.

This solution has the disadvantage in the production process of requiring several adhesive strips on the rear of the card to obtain stability of the mini-card in its housing; it also results in surface irregularities on the rear of the adapter.

The invention mainly aims to solve the above problems.

It relates mainly to the design of a mini-card adapter that allows repeated removal and replacement of the mini-card in an extremely straightforward manner, while guaranteeing the correct stability of the mini-card in its housing and with no surface irregularities on the rear of the support card.

Another aim of the invention is to allow easy production of the adapter.

The principle of the invention consists of replacing the above strips of the prior art with a single label or adhesive film comprising a recess allowing extraction pressure to be exerted on the mini-card through the recess; the label excess is preferably removed after being positioned on the adapter.

For this purpose, the invention initially relates to a format adapter comprising a storage device having a front surface equipped with electric contact pads opposite a rear surface defining a bottom peripheral border, said adapter comprising a cavity for accommodating the device which opens onto the front and rear surfaces of the body, and a pressure-sensitive adhesive film, glued to the rear surface of the body and having at least one adhesive portion inside the cavity in order to hold the storage device.

It is characterised in that the adhesive film has an inner recess substantially centred on the cavity and at least one shoulder bordering on the cavity assuring localised adhesion only on the bottom peripheral border of the device.

This configuration has the particular advantage of allowing repeated removal of the card or storage device, in particular with a single finger, without mechanical stress on the mini-card or adapter support and even without deforming the adhesive film.

Given the reduced width of the adhesive margin, it is not unduly deformed when the device is removed by pressing it with one finger.

According to further characteristics:
the shoulder is continuous;
the shoulder has a width comprised between 0.1 and 5 mm;
the recess is sized such as to allow the mini-card to be pressed directly with a finger through the recess;
the film extends perfectly out to the outer edge of the adapter body;
the attachment body comprises a removable mini-card intended for the cavity;
the external format of the adapter body is the same as the Plug-in format and the cavity is sized to accommodate a Mini-UICC card;
the format of the adapter body is the same as the ISO format and the format of its cavity matches that of a Mini-UICC or Plug-in UICC card or a memory card in SD, MMC, Mini SD, MMC Micro, Memory Stick or USB key format or any memory-card format with accessible contacts on the top surface.

The invention also relates to a method for producing a format adapter for a storage device, said method comprising the following steps, according to which:
a support with a cavity for accommodating the device opening onto the front and rear surface of the body and an area for extraction of the adapter body is provided,
a pressure-sensitive adhesive film is fixed to the rear surface of the support, at least partially covering the cavity, The method is characterised in that it comprises the following steps according to which the adhesive film is sized and positioned so as to have an inner recess substantially centred on the cavity and at least one shoulder located only at the inner peripheral margin of the cavity.

The manufacturing process is therefore simplified with a single, correctly sized film and a single, adapted positioning step.

According to a preferred embodiment of the invention, the adhesive film is provided with an inner recess and the recess is substantially centred on the cavity such as to form a continuous margin on the inner border of the cavity.

According to another embodiment, the recess is formed by cutting, with the film attached to the support.

According to further characteristics of the method:
the support is provided with an area for extracting (12) the body of the adapter;
the film is applied such as to cover at least the entire extraction area of the adapter;

a partial pre-cut of the adapter is made along a delimitation of its extraction area so as to cut the excess adhesive film beyond the surface of the adapter and to form a predetermined breakage line ensuring that the adapter can be detached from the support.

According to a particularly interesting implementation of the method:

the support also comprises an area for extracting a mini-card compatible with the adapter;

in particular, the mini-card is pre-cut so as to form a predetermined breakage line ensuring that the mini-card can be detached from the support.

The invention also relates to a use of the adapter to adapt a chip-card production operation to a storage-device production operation and/or as packaging for a storage device.

Other special features and advantages of the invention will become apparent from reading the following description made as a strictly non-limiting illustrative example of the invention in reference to the appended figures, in which:

FIGS. 3 to 6 depict an embodiment of the method for obtaining the adapter.

Figure 1:
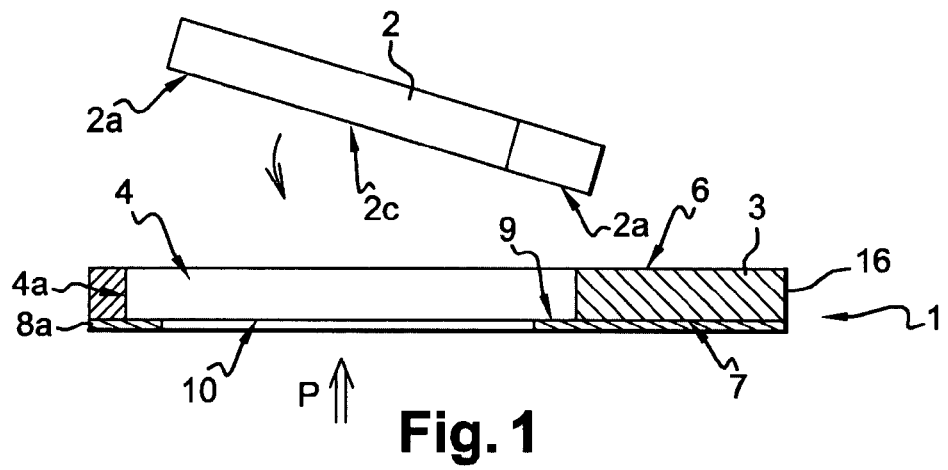
FIG. 1 depicts a longitudinal section view of the adapter of FIG. 2 and a mini-card approaching the cavity.
Figure 2:
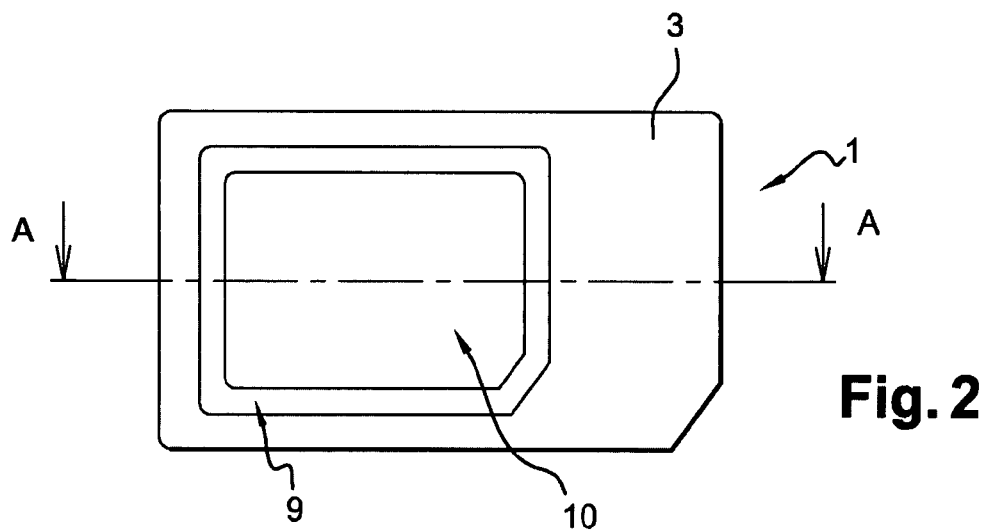
FIG. 2 depicts a front view of the adapter according to one embodiment of the invention.

In FIG. 1, an adapter 1 in mini-card format 2, according to one embodiment, comprises a body 3 having a cavity 4 for accommodating a mini-card 2 with a micro-module 5. The cavity passes through the body 3 and therefore opens onto the front 6 and rear 7 surfaces of the adapter body. The cavity comprises an inner border 4a.

In the example, the external format of the adapter 1 complies with a standard such as the Plug-in UICC format (ID-000 or mini-SIM standard). However, any format can be used, in particular it can have a larger format such as ISO ID1 or a smaller format.

The adapter can also be used in fields other than mobile telephony, in particular other than GSM.

The cavity has dimensions that are suitable for accommodating a mini-card, in this case a Mini-UICC or Plug 3G card. The cavity can also have any dimension that is suitable for any mini-card.

A pressure-sensitive adhesive film 8 is glued to the rear surface of the support so as to hold the mini-card in the cavity. Pressure-sensitive is taken to mean that the adhesive is capable of making the card adhere by pressing the latter against the former, while allowing it to be removed numerous times.

According to the embodiment of the invention, the adhesive film 8a has a margin 9 or excess which preferably extends in a continuous fashion inside the cavity and to the margin of the latter. The margin of the film that can be used to adhere the mini-card extends parallel to the surface 7 of the support 3 from the inner edge 4a of the cavity to the inside of the latter.

The excess film in the example is constant and continuous. It is important for it to offer good stability for the mini-card when the latter is fixed on it. This stability is particularly necessary when the electric connectors, for example of an electric personalisation machine or a mobile telephone, exert a force directed from the front surface towards the rear surface.

Alternatively, the excess can have portions (in particular 4, 3 or 2 located on the sides or corners) which can even appear in a discontinuous manner in the cavity.

In this way, the shape of the excess can be triangular, round or others.

According to the embodiment of the invention, the film is formed by a single element and comprises a recess 10 which opens into the cavity.

This recess makes it possible to press directly on the rear of the mini-card using an object with a rounded edge or preferably a fingertip or finger through the recess. The recess is even more beneficial for extracting the mini-card than the adapter with a small format similar to that of the mini-card, such as a Plug-in UICC/Mini UICC adapter. Indeed, bending the adapter body to remove the mini-card from the cavity, which is possible with adapters in ISO format, is dangerous for the smaller formats.

In the example, the recess is preferably substantially centred on the cavity so as to have a continuous lip or shoulder 9 with a constant width. In this way, the adhesion is evenly distributed across the edge of the mini-card.

The insertion of a finger in the recess does not, in principle, unduly damage the inner margin of the film insofar as the pressure and/or deformation from the pressing force (P) is evenly distributed on the card or on the margin of the film.

According to one embodiment of the invention, the adhesive film extends perfectly out to the outer contour 16 of the adapter body. This has the effect not only of improving the aesthetic appearance of the body, but also of causing the film to adhere completely to the surface of the body in order to respect the standard dimensions of the adapter body (the film does not stick out over the edge of the body): a film that is too short results in a small step and unevenness of the border.

Even more important than ensuring that the film adheres to the entire surface is for the adapter to comprise narrow portions such as the left lateral branch of the adapter in FIG. 1.

In the example, the surface and the adhesive strength of the adhesive are chosen so as to provide an adhesive strength that can withstand a pressing force on the mini-card of less than 8 N, tending to separate the card from the adhesive film, while providing resistance to delamination of more than 3 N/cm between the film and the adapter.

The film has, for example, a thickness of 0.07 mm and an adhesive strength on steel of 2 N/cm. It is, for example, supplied by the company SCAPA with reference Scapa 1201.

The adhesive film is so thin that it allows the adapter body to comply with a standard thickness tolerance for Plug-in cards and the mini-card without adhesive to comply with a standard thickness tolerance for Mini-UICC cards.

The respective thicknesses of the support 3 and the adhesive 8a are therefore chosen according to the constraints listed above.

The film is preferably transparent and therefore covers the entire adapter. The advantage being that it avoids altering any logo or graphic customisation placed on the rear of the adapter.

When the mini-card 2 is in position in the adapter, the margin (9) adheres only to one portion of the mini-card on the bottom peripheral border 2a and the recess (10) provides access to a central portion 2c of the bottom surface of the mini-card.

This central portion allows graphic customisations to be made on the rear of the mini-card or memory card once it has been placed in the adapter.

The following describes one implementation of the method of producing an adapter according to the invention.

According to this embodiment, the method comprises a first step of supplying a support 11 from which the adapter is then extracted (FIG. 3).

The body in the example is obtained by injection and already has a cavity 4 for receiving the mini-card opening onto the front 6 and rear 7 surfaces of the body. The body can be obtained alternatively by lamination.

The cavity 4 is preferably made directly by injection at the same time as the body, but it can be made at a later stage by cutting or milling.

This support is preferably in ISO format, but can also have other dimensions, in particular larger, for example in the form of a continuous strip or plate defining several supports to be cut.

The support comprises, in dotted lines 12, an area for extracting the adapter body, located around the aforementioned cavity.

The next step (FIG. 4) includes fixing a pressure-sensitive adhesive film 8 to the rear surface of the support, at least partially covering the cavity.

A labelling machine which is capable of accurately applying the adhesive labels, for example with a positioning precision of 0.1 mm, is used for this purpose. The already pre-cut labels comprising the recess are supplied in a continuous strip for this purpose.

According to one characteristic of the method, the adhesive film is dimensioned and fixed so that it has a recess (10) allowing device extraction pressure to be exerted through the recess.

In the example, the film already comprises a central recess 10 which simply needs to be positioned so as to open into the cavity, with several portions of film that partially cover the cavity and are evenly distributed around the latter.

The size of these portions and their locations are chosen so as to ensure the correct seating of the mini-card.

Preferably, the recess is substantially centred on the cavity in order to form a continuous margin 9 with a constant width on the inner border of the cavity. In the example, the margin extends evenly inside the cavity with a width comprised between 0.1 and 5 mm, preferably around 1 mm. A compromise must be reached between adhesive strength, gluing surface and the recess for extracting the mini-card. Good results have been obtained with a margin width comprised between 0.5 and 3 mm.

Another advantage of having the most discreet margin possible is that it allows graphic customisation of the rear surface of the mini-card when attached to the adapter, the mini-card being produced outside the adapter. It is also possible to customise the mini-card and its adapter at the same time.

It is notable, in this particular example, that the margin of the adhesive film comprises five portions respectively matching the five sides of the cavity, thus ensuring excellent seating for the mini-card.

The recess can also be made by subsequently cutting the label once it has been positioned on the body.

Another characteristic of the method relates to the dimensions chosen for the film: it is sized so as to cover at least the entire extraction area 12 of the adapter. This means that the film can cover the entire surface of the support or simply exceed the dotted line by a margin 13 that makes it easier to position the film, for example with a margin of 5 to 10 mm around the entire extraction area.

In the example, the film extends advantageously just a bit beyond the edge of the dotted line, exceeding it by a width of less than 0.8 mm corresponding to the width of cutting by stamping.

In the next step (FIG. 5), the adapter is partially pre-cut along the delimitation of its extraction area.

This has the effect of not only cutting the adhesive film excess or margin beyond the adapter surface, but also of forming a predetermined breakage line ensuring that the adapter can be detached from the support for subsequent use.

The pre-cut 15 can be the result of a cutting or stamping operation that aims to remove material with a greater or smaller width, for example 0.5 to 2 mm beyond the dotted line 12 up to a limit 14 (detail in FIG. 4a) leaving one or several attachment bridges or strips (p) connected to the support remaining beyond the contour of the adapter.

In this way, the excess adhesive film is removed by cutting when its contour is inside the cutting area 15. This results in the adhesive film extending perfectly out to the edge 16 of the adapter without exceeding it.

As shown in FIG. 6, it is possible to use the support 11 to extract a mini-card 2 compatible with the adapter and/or for use as a standard chip card.

For this reason, using the support in FIG. 5, it is possible to create a cavity 17 for accommodating a chip-card module 18 (comprising for example a contact pad, chip, dielectric, connections), thereby forming a chip card 19 in ISO format.

With the aim of using it as depicted in FIG. 6, a partial pre-cut 15a as above is formed around this cavity, in order to provide a predetermined breakage line so that the mini-card can be extracted or separated from the support by simply pressing on it with a finger.

Thus, with the same support, the invention provides a chip card in ISO format, a mini-card with a removable chip in Mini-UICC format which can be used in the cavity 4, and a detachable adapter in plug-in format which can transform the Mini-UICC format to Plug-in UICC format.

When used in ISO/Mini-UICC format, the user extracts the mini-card from the attachment support for Mini-UICC use in a latest-generation mobile.

Alternatively, the user can insert (following the arrow F) the mini-card 2 in the adapter (FIG. 6) which is fixed to the attachment body, thus also forming another chip card (19 F) in ISO format like the card 19 in the same FIG. 6.

For the latter use, the various cavities are positioned in the support so as to obtain a card that is compatible with a standard, in particular ISO 7816, and to allow use of current production and/or customisation tools, in particular electrical, with no major modifications of the existing production equipment.

The inventive method can also be used for other sizes of adapter bodies and/or cavities for accommodating storage devices. In this way, for example, the ISO/Plug-in adapter body can have a format matching the ISO format, while its accommodating cavity can have a format matching a Plug-in UICC card or a memory card in SD, MMC, Mini SD, MMC Micro, Memory Stick or USB key format or any memory-card format with accessible electrical contacts 23 on the top surface. The device can be distinct from a chip card and/or be thicker or thinner than the adapter.

The storage device can have a format that is different from a chip card, for example being thicker or thinner, and can be produced using certain methods and manufacturing devices that are specific to the chip card, such as stamping, customisation, insertion, electrical connection, coating, conveyance from station to station, etc.

Figure 7:
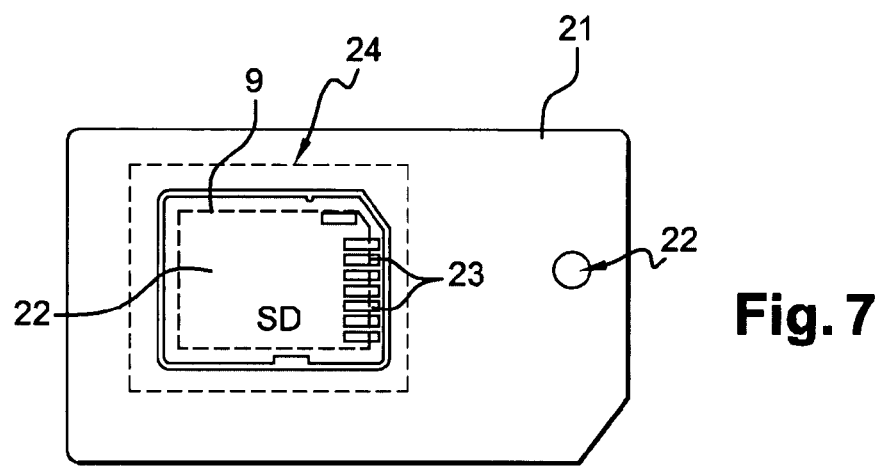
FIG. 7 depicts one use of an adapter in ISO ID1 format to conduct a production and/or packaging operation with an MMC-type memory card positioned in the adapter.

FIG. 7 depicts a view of a multimedia memory card, in particular an SD card (20) placed in an adapter 21 in ISO 7816 (ID1) format, viewed from the front.

Advantageously, this adapter makes it possible to adapt the shapes of the device for the purpose of using it, as well as for manufacturing and/or packaging purposes.

Particularly, the adapter allows a chip-card production operation to be adapted to the production of a storage device such as a memory card or any other device which can be temporarily held in the cavity, such as those mentioned above.

The operations for production of a device can comprise any operation from among those including insertion, electrical and/or graphic customisation, packaging, etc.

In the case of insertion, for example, it is sufficient to place a device body with a module reception space (empty case) in the cavity of the adapter.

The adapter and the device are then placed in a normal chip-card production chain to undergo other operations.

Next, a module (comprising a chip, contact pads, etc.) is inserted normally as for a chip card.

At the end of the production process, the adapter can be used as packaging for the device. Preferably, the film can cover the entire surface of the ISO card (21) except the recess. In the example, the film 24 (in dotted lines) is configured the same as above to have a narrow margin 9 inside the cavity.

The film advantageously does not cover a central area of the card, therefore allowing it to be printed with a graphic as required.

The film in the example only covers part of the rear surface of the ISO card: it is presented in the form of a frame having sides or branches with a width equal to around 1 cm between the inner and outer peripheral areas of the frame, but can also have other shapes such as an oval or a triangle or even represent a figure for decorative purposes.

If required, an orifice 22 is made in the adapter body allowing it to be hung on a display stand. The body of the device can also have an additional orifice. This orifice can, as required, be used to insert a key ring or to match the device with its packaging, by means of attachment means such as a strap.

The invention claimed is:

1. Format adapter comprising a storage device having a front surface equipped with electric contact pads opposite to a rear surface defining a bottom peripheral border, said adapter comprising:
   an adapter body having a cavity for accommodating the device which opens onto front and rear surfaces of the adapter body, and
   a pressure-sensitive adhesive film, glued to the rear surface of the adapter body by contact between a side of the adhesive film having adhesive thereon and the rear surface of the adapter body, at least one portion of the side having adhesive thereon being arranged to contact and hold the storage device within the cavity,
   wherein the adhesive film has an inner recess substantially centred on the cavity and at least one shoulder bordering on the cavity assuring localised adhesion only on the bottom peripheral border of the device.

2. Adapter according to claim 1, wherein the shoulder is continuous.

3. Adapter according to claim 1, wherein the shoulder has a width comprised between 0.1 and 5 mm.

4. Adapter according to claim 1, wherein the recess is sized such as to allow the device to be pressed directly with a finger through the recess.

5. Adapter according claim 1, wherein the film extends perfectly out to the outer edge of the adapter body.

6. Adapter according to claim 1, wherein said adapter is connected in a detachable manner to an attachment support body with a larger surface by a partial pre-cut.

7. Adapter according to claim 6, wherein the attachment body comprises a detachable device intended for the cavity.

8. Adapter according to claim 6, wherein the format of the attachment body corresponds to the ISO format.

9. Adapter according to claim 1, wherein the film has an adhesive strength that can withstand a pressing force on the mini-card of less than 8 N while providing resistance to delamination of more than 3 N/cm between the film and the adapter.

10. Adapter according to claim 1, wherein the external format of the adapter body is the same as the Plug-in UICC format and the cavity is sized to accommodate a Mini-UICC card.

11. Adapter according to claim 1, wherein the format of the adapter body is the same as the ISO format and the format of its cavity matches that of a Mini-UICC or Plug-in UICC card or any of the various storage-device formats such as SD, MMC, Mini SD, MMC Micro or Memory Stick or USB key or any memory-card format with accessible contacts on the top surface.

12. Method of producing a format adapter for a storage device, said method comprising the following steps according to which:
   a support with a cavity for accommodating the device opening onto the front and rear surface of the body and an area for extraction of the adapter body is provided,
   a pressure-sensitive adhesive film is fixed to the rear surface of the support, at least partially covering the cavity, by contact between a side of the adhesive film having adhesive thereon and the rear surface of the support, at least one portion of the side having adhesive thereon being arranged to contact and hold the storage device within the cavity, and
   the adhesive film is sized and positioned so as to have an inner recess substantially centred on the cavity and at least one shoulder located only at the inner peripheral margin of the cavity.

13. Method according to claim 12, wherein the recess is formed by cutting, the film being fixed on the support.

14. Method according to claim 12, wherein
   the support is provided with an area for extracting the body of the adapter,
   the film is applied such as to cover at least the entire extraction area of the adapter,
   a partial pre-cut of the adapter is made along a delimitation of its extraction area so as to cut the excess adhesive film beyond the surface of the adapter and to form a predetermined breakage line ensuring that the adapter can be detached from the support.

15. Method according to claim 12, wherein the support also comprises an area for extracting a mini-card compatible with the adapter.

16. Method according to claim 15, wherein the mini-card is pre-cut so as to form a predetermined breakage line ensuring that the mini-card can be detached from the support.

17. Method according to claim 12, wherein the support is in ISO format.

* * * * *